Patented July 1, 1941

2,247,807

UNITED STATES PATENT OFFICE 2,247,807

MINERAL OIL COMPOSITION

Everett W. Fuller, Woodbury, N. J., assignor to Socony-Vacuum Oil Company, Incorporated, New York, N. Y., a corporation of New York No Drawing. Application December 5, 1939, Serial No. 307,589

6 Claims. (Cl. 252—46)

This invention has to do in a general way with the production of mineral oil compositions and is more particularly related to mineral oil compositions having characterizing properties which render them especially suitable for use as lubricants for turbines and as dielectrics for electrical equipment such as transformers. As is well known to those familiar with the art, a mineral oil fraction which has been "moderately refined" as by treatment with moderate amounts of sulfuric acid or by solvent-extraction processes will under the conditions of use encountered in turbines and transformers form substantial quantities of insoluble sludge. Such sludge formation clogs the pipes and valves of the oil-circulating systems of turbines and the cooling ducts of a transformer. By forming films on the insulation it reduces the heat transfer in transformers and in addition it substantially reduces the dielectric properties of the oil.

This tendency to form sludge in a viscous petroleum fraction may be reduced by refining treatments wherein very large amounts of sulfuric acid or of selective solvents or substantial quantities of fuming sulfuric acid may be used. The so-called highly refined oils of the type obtained by the treatments just described as expensive to prepare because of the high treating loses and the large quantities of refining agents used. Furthermore, these highly refined oils tend to form acidic products which attack the metals with which they come in contact and also lower the dielectrical properties of the oil.

The cost and other disadvantages of these highly refined oils have led to the investigation of means whereby oils moderately refined with moderate amounts of sulfuric acid or with selective solvents may be treated by the addition of an agent which will act as a negative catalyst to retard or inhibit the formation of sludge under the conditions of use encountered. These investigations, which have been relatively extensive in scope, have led to the suggestion of a number of materials as inhibitors of sludge formation in moderately refined oils. Many of these materials, however, have failed to prove entirely satisfactory for various reasons such as their low inhibiting effect, their cost and their low solubility in the oil.

The present invention has as its primary object the production of a non-sludging moderately refined oil for use in turbines and transformers. By the term moderately refined as used herein reference is had to oils of the normally sludging type which may be obtained either by refining treatment with moderate quantities of sulfuric acid or by the various solvent-extraction processes. This invention is predicated upon the discovery of a compound which possesses outstanding characteristics as an inhibitor or a negative catalyst toward sludge formation in normally sludging moderately refined mineral oil fractions under the conditions of use encountered in turbines and transformers.

The present invention, which is a continuation in part of the copending Story and Fuller application Serial No. 143,622, filed May 19, 1937, is based upon the discovery that beta naphthol disulfide (2,2' dihydroxy 1,1' dinaphthyl disulfide), when admixed in relatively minute quantities with moderately refined normally sludging oils, produces outstanding reductions in the rate of sludge formation and renders such oils more suitable for use in turbines and transformers.

I have found that beta naphthol disulfide possesses outstanding characteristics which distinguish this compound from the general class of hydroxyaryl sulfides and polysulfides for use in the particular mineral oil blends contemplated herein. These outstanding characteristics include a relatively high solubility in mineral oil (as compared with other hydroxyaryl mono- and poly- sulfides), high stability, low cost and ease of synthesis, and relatively high sludge-inhibiting power.

Beta naphthol disulfide is a yellow powder melting at about 166° C. which is soluble to from about 0.30 to 0.50 per cent in petroleum oils at room temperature. It may be readily prepared by a number of methods, such as the reaction of sulfur chloride on beta naphthol (Ber. 27, 2993); the reaction of sulfur, sodium carbonate and beta naphthol; (Compt. rend. 198, 1432); and by other methods described in the literature.

The effectiveness of beta naphthol disulfide as an inhibitor of sludge formation in viscous mineral oil fractions of normally sludging type is demonstrated by the following examples.

Example 1

The oil used in this test was a moderately refined light turbine oil stock obtained from a blend of 92 per cent Mid-Continent distillate and 8 per cent Coastal distillate by treating with 70 pounds of 98 per cent sulfuric acid per barrel, followed by neutralization, washing, and clay percolation. The refined oil had an A. P. I. gravity of 29.4, a Saybolt Universal viscosity of 152 seconds at 100° F., and a flash point of 385° F. The test involved heating 25 cc. samples of oil alone and an oil blend containing 0.10 per cent of beta naphthol disulfide to a temperature of 200° F. with 5 liters of air per hour bubbling therethrough. During the test the oil was maintained in contact with metal by placing 24 inches of 18-gauge copper wire and 1 gram of iron granules in each sample. Also, 2 cc. of distilled water were added each day. The samples were tested for acidity, color, and sludge at varying periods of time, and the results obtained are listed in Table I below, wherein the oil indicated as Oil A was the oil alone and the oil indicated as Oil B was a blend of the same oil containing 0.10 per cent of beta naphthol disulfide.

*Table I*

| Oil | Time in hours | N. N. | Color Lovi. | Sludge mg./25 cc. |
|---|---|---|---|---|
| Oil A | 89 | 1.1 | 34 | 54 |
|  | 305 | 3.6 | 100 | 148 |
| Oil B | 240 | 0.01 | 7 | 4 |
|  | 596 | 0.08 | 19 | 39 |
|  | 740 | 0.26 | 40 | 36 |

EXAMPLE 2

The oil used in this test was one which had been refined by extraction with furfural to a 25 per cent loss and had an A. P. I. gravity of 31.8 and a Saybolt viscosity of 136 seconds at 100° F. This oil was subjected to the same test described above in Example 1, and the results obtained are listed in Table II below, in which oil A is the oil alone and oil B is the same oil containing 0.10 per cent of beta naphthol disulfide.

*Table II*

| Oil | Time in hours | N. N. | Color Lovi. | Sludge mg./25 cc. |
|---|---|---|---|---|
| Oil A | 96 | 1.0 | 10 | 81 |
|  | 167 | 8.2 | 68 | 127 |
|  | 237 | 21.2 | 285 | 799 |
| Oil B | 260 | 0.01 | 4 | 4 |
|  | 504 | 0.66 | 40 | 24 |
|  | 668 | 1.3 | 43 | 53 |

From the foregoing examples it will be seen that beta naphthol disulfide is an effective inhibitor of sludge formation in normally sludging oils. The inhibitor may be used in varying amounts ranging from 0.01 per cent to from about 0.3 to 0.5 per cent, but I have found that outstanding results may be obtained by using beta naphthol disulfide in the range of from 0.01 per cent to 0.2 per cent, and this range is therefore considered as being preferred.

I claim:

1. A mineral oil composition of the type adapted for use in turbines and transformers comprising a moderately refined mineral oil potentially susceptible to the formation of sludge under the conditions of use normally encountered in turbines and transformers and at least 0.1 per cent of beta naphthol disulfide sufficient to resist the formation of said sludge under said conditions of use.

2. A mineral oil composition comprising a mineral oil moderately refined to meet specifications for turbine use and potentially susceptible to the formation of sludge under the conditions of such use and 0.1 per cent of beta naphthol disulfide sufficient to inhibit the formation of sludge under said conditions of use.

3. A lubricant composition comprising a mineral oil refined to meet specifications for transformer use and potentially susceptible to the formation of sludge under the conditions of such use and at least 0.1 per cent of beta naphthol disulfide sufficient to inhibit the formation of sludge under said conditions of use.

4. A mineral oil composition comprising a viscous mineral oil fraction refined to meet the conditions of use encountered in turbines and transformers and in admixture therewith from about 0.01 per cent to 0.2 per cent of beta naphthol disulfide.

5. A mineral oil composition comprising a viscous mineral oil fraction refined to meet the specifications for turbine use and normally susceptible to the formation of sludge under the conditions of such use, such oil having in admixture therewith from about 0.01 per cent to 0.2 per cent of beta naphthol disulfide.

6. A mineral oil composition comprising a moderately refined viscous mineral oil fraction refined to meet transformer oil specifications and normally susceptible to the formation of sludge when used in a transformer, such oil having in admixture therewith from 0.01 per cent to 0.2 per cent of beta naphthol disulfide.

EVERETT W. FULLER.